(12) United States Patent
Heiler et al.

(10) Patent No.: US 10,175,685 B2
(45) Date of Patent: Jan. 8, 2019

(54) DIAGNOSTIC DEVICE AND METHOD FOR MONITORING THE OPERATION OF CONTROL LOOPS

(71) Applicant: Siemens Aktiengesellschaft, Munich (DE)

(72) Inventors: Patrick Heiler, Waghaeusel (DE);
Bernd-Markus Pfeiffer, Woerth (DE)

(73) Assignee: Siemens Aktiengesellschaft, Munich (DE)

( * ) Notice: Subject to any disclaimer, the term of this patent is extended or adjusted under 35 U.S.C. 154(b) by 307 days.

(21) Appl. No.: 15/041,339

(22) Filed: Feb. 11, 2016

(65) Prior Publication Data
US 2016/0259328 A1    Sep. 8, 2016

(30) Foreign Application Priority Data
Mar. 4, 2015    (EP) ..................... 15157643

(51) Int. Cl.
G05B 23/02    (2006.01)

(52) U.S. Cl.
CPC ..... *G05B 23/0205* (2013.01); *G05B 23/0221* (2013.01)

(58) Field of Classification Search
CPC .................. G05B 23/0205; G05B 23/0221
See application file for complete search history.

(56) References Cited

U.S. PATENT DOCUMENTS

| 5,838,561 A | 11/1998 | Owen |
| 6,650,947 B2 | 11/2003 | Fu et al. |
| 2008/0126861 A1 | 5/2008 | Zielinski et al. |
| 2013/0046396 A1 | 2/2013 | Blevins et al. |

FOREIGN PATENT DOCUMENTS

| CN | 101322086 | 12/2008 |
| CN | 101403924 | 4/2009 |
| CN | 101517504 | 8/2009 |
| CN | 104950873 | 9/2015 |

(Continued)

OTHER PUBLICATIONS

Gigi et al., "Quantification of interaction in multiloop control systems using directed spectral decomposition", Automatica 49 (Mar. 2013), pp. 1174-1183.*

(Continued)

*Primary Examiner* — Cory W Eskridge
(74) *Attorney, Agent, or Firm* — Cozen O'Connor (57) ABSTRACT

A diagnostic device and method for monitoring operation of automation system control loops includes an evaluation device and a data memory storing sequences of actual-value data of the control loops. An absolute value maximum of a cross-correlation function, for an excitation resulting from changes in a setpoint setting of one control loop, is determined as a first quantitative measure for positive time lag of the sequence of actual-value data of another control loop, and a numeric parameter evaluating an interaction effect of the one control loop on the other is determined as a function of the first quantitative measure. Strength and direction of the interaction effect are displayed. The calculations are repeated for all pairs of monitored control loops and a matrix of the numeric parameters is displayed.

12 Claims, 3 Drawing Sheets

(56) References Cited

FOREIGN PATENT DOCUMENTS

DE 102 12 909 11/2002
EP 1528447 5/2005
JP 2000-214903 8/2000

OTHER PUBLICATIONS

Nguyen et al., "Independent design of multi-loop PI/PID controllers for interacting multivariable processes", Journal of Process Control 20 (Jun. 2010), pages 922-933.*
Harris et al., A Review of performance monitoring and assessment techniques for univariate and multivariate control systems, Journal of Process Control vol. 9, Jan. 1999, pp. 1-17.*
Rahman et al., "Detection of control loop interactions and prioritization of control loop maintenance", Control Engineering Practice 19 (Mar. 2011), pp. 723-731.*
Smuts, "Analyzing and Improving Control Loop Performance", Power Engineering, Nov. 2011, 14 pages.*
Huang et al., "A direct method for multi-loop PI/PID controller design", Journal of Process Control 13 (Feb. 2003), pp. 769-786.*

* cited by examiner

DIAGNOSTIC DEVICE AND METHOD FOR MONITORING THE OPERATION OF CONTROL LOOPS

BACKGROUND OF THE INVENTION

1. Field of the Invention

The invention relates to a diagnostic device and method for monitoring the operation of control loops of an automation system.

2. Background of the Invention

The maintenance and servicing of automation systems can be improved if subsystems or components are monitored to ensure that they are functioning correctly. In the event of a degradation in operational performance, a targeted intervention can be carried out at the right point in the system by means of servicing, maintenance or troubleshooting measures. Components of automation engineering installations are often interconnected in control loops. To enable, in response to a deterioration in operating efficiency of individual control loops, timely and targeted intervention at the right point in the system through maintenance or controller optimization measures, it would be advantageous to continuously and automatically monitor the control performance of such control loops.

A diagnostic method for monitoring the operation of a control loop is already known from EP 1 528 447 B1. In an essentially stationary state, i.e. given a largely constant setpoint setting, the variance in a sequence of actual-value data is determined as a stochastic signal feature and evaluated to analyze the state of the control loop. In response to an excitation of the control loop corresponding to a step change in setpoint value, the relative overshoot and/or the settling ratio, i.e. the quotient from rise time and settling time of the controlled process variable, are evaluated as deterministic signal features for use in analyzing the state of the control loop.

In chemical processing plants or process control installations that are equipped with automation systems, numerous single-loop control loops, for example comprising PID controllers, are linked with one another in most cases via physical, thermodynamic, chemical or biological interactions of the respective overall process. Any movement in a control loop can therefore have an impact in the nature of a disturbance on other control loops. Since interactions between the control loops, which in this disclosure are also referred to as cross-influences, couplings or interaction effects, do not generally represent a problem in the operation of a system, they are not in most instances more closely scrutinized by plant operators and are not included in the monitoring of control loops operation. If they were taken into account, however, it would be possible in certain circumstances to achieve a significant improvement in the operation of the system, for example with regard to energy efficiency or the quality of the products being produced with the aid of the system.

OBJECTS AND SUMMARY OF THE INVENTION

The present invention is accordingly based on the objective of providing a diagnostic device and diagnostic method for monitoring the operation of control loops for interaction effects of one control loop on another and thereby permit a direct evaluation of the interactions of individual control loops with respect to one another.

The present invention provides the advantage that it enables control loops to be monitored for interactions amongst control loops and the evaluation of such interactions based in particular on graphic representation of the monitoring result. This permits achievement of significant improvements in system behavior. In the context of monitoring and optimization of the control performance of, ideally, all of the control loops of a system, the knowledge of such interactions is extremely useful for more accurately localizing the causes of problems and for planning corrective or responsive measures in a targeted manner. Problems in one control loop propagate into a plurality of other control loops, most commonly through couplings of the control loops. By evaluating interactions the identification of a particular control loop that is actually causing the problems can be effected. The interaction analysis can also reveal that certain control loops exert a greater influence than others. An assessment by significance in the system of the individual control loops can therefore be of great benefit, and allows what are found to be the most important control loops of a system to be assigned a higher priority for maintenance and to achieve the fastest possible improvement in system behavior.

The present invention provides the added advantage that no scaling factors of any kind are required to apply the diagnostic method or to use the diagnostic device and, furthermore, no background knowledge concerning a process executing on the system or the automated system itself is necessary. The diagnosis can therefore be performed by a user in a particularly simple manner.

A discrete-time cross-correlation function can advantageously be used for the diagnosis, this function being defined between two discrete signals x and y, each having a data sequence of length N, as follows:

$$R_{xy}(\tau) = \frac{\frac{1}{N}\sum_{i=0}^{N-1-\tau} x(i+\tau)*y(i)}{\sqrt{\sigma_x^2 * \sigma_y^2}}, (\tau = 0, \ldots, N-1).$$

In this equation, $\tau$ represents a positive time lag, referred to as the duration of a sampling interval, of signal x with respect to signal y, $\sigma_x^2$ represents the variance of signal x, and $\sigma_y^2$ represents the variance of signal y.

For evaluating the interaction effect of one control loop on another, use is advantageously made of the cross-correlation function of the controlled process variables with a positive time lag $\tau$ of the controlled process variable of the respective other control loop. If an excitation of one control loop due to a change in a setpoint setting, for example having a ramp-like response curve or preferably having a response curve corresponding to a step function, has an influence on the controlled process variable of the respective other control loop, then a large value will be found in the cross-correlation function. The stronger the coupling, the greater the function values of the cross-correlation function. If, on the other hand, no influence is present, then the cross-correlation function will assume only relatively small values. A particularly significant indicator for this evaluation of the interaction is a first quantitative measure for which the greatest value in terms of absolute value of the cross-correlation function for a positive time lag $\tau$ is sought. The reason for the positive time lag lies in the cause and effect relationship: It is not possible to obtain a reaction to a setpoint step change, for example, if this has not yet taken place. For this reason, for a setpoint step change at a control loop, the cross-correlation function is formed between the response curve of its controlled process variable, i.e. the sequence of its actual-value data, and the response curve of the controlled process variable measured at the same time at the respective other control loop, i.e. the sequence of actual-value data of the respective other control loop, for a positive time lag $\tau$.

A plurality of response curves are suitable in principle for exciting one of a pair of control loops by changing its setpoint setting, e.g. ramp-like response curve, setpoint step change or a square-wave pulse of predefined height and width. However, excitation by means of a setpoint step change of a predefined height has been shown to be particularly advantageous with regard to the validity and reliability of the diagnostic result.

According to a particularly advantageous aspect of the invention, sequences of actuating value data of control loops that are to be monitored can be stored in addition in the data memory and, as in the determination of the first quantitative measure, i.e. in accordance with the same calculation rule, but using other signals, a second quantitative measure is determined on the basis of actuating value data and the arithmetic mean of the two quantitative measures is calculated. If, namely, the controller of a control loop is set to comparatively fast-acting, it will instantly correctly adjust to compensate for the cross-influence of another control loop, which can result in no interaction being detectable in the response curve of the controlled process variable. However, owing to the active intervention of the fast controller, i.e. of a controller exhibiting a rapid reaction to a possible system deviation, the cross-influence will be clearly visible in the manipulated variable that is generated. It is therefore additionally advantageous to correlate the manipulated variables of the pair of control loops that are to be monitored with one another to further improve the validity of the diagnostic result. The mean value of the summed amount of the two cross-correlation functions of the controlled process and manipulated variables can advantageously be determined and displayed as a parameter for evaluating the interaction.

Since a slight random similarity of the signals is always to be expected due to noise effects and other sources of disturbance, a limit value can advantageously be defined in order to specify as to when a true coupling, which can potentially cause disturbances as an interaction, is present and when presumably only noise or other types of disturbance are involved. As a default setting, this value can be set for example to 0.6, since in cases of strong coupling between two control loops the cross-correlation functions will assume significantly greater values. Owing to the definition of the cross-correlation function, this value cannot, of course, exceed 1.

In addition to indicating the strength of the coupling by means of the numeric parameter, the direction of the coupling with its effective direction can also be determined with the aid of the cross-correlation function and displayed. It is thus advantageously possible to infer whether a positive setpoint change at one control loop will trigger a positive or a negative change in the controlled process variable at the respective other control loop of the pair of control loops that are to be monitored.

If an automation system possesses a plurality of control loops, in order to provide a quick overview of the strength of the respective interactions of the control loops that are to be monitored, the result of the diagnosis can be represented with particular clarity if the control loops are consecutively numbered and numeric parameters $KKF_{i,j}$, where $i \neq j$, for evaluating the interaction effect of the i-th control loop of the control loops that are to be monitored on the j-th control loop are entered in a matrix having row index i and column index j.

This overview through use of a matrix can be expanded in a particularly simple manner with an indication of the effective direction of the interactions through inclusion of a corresponding sign prefixing the numeric parameters.

In a further advantageous embodiment, row sums of the absolute values of the numeric parameters are calculated with the aid of the matrix. Based on the row sums, a sorted list of all of the control loops, ordered according to the respective influence that these exert on the other control loops, can readily be obtained. Control loops that, based on this criterion, are of particularly great significance can be handled with special priority within the scope of a post-diagnosis optimization of the automation system for eliminating any problems that have been detected.

The diagnostic device can advantageously be embodied in the same way as the diagnostic device already known from EP 1 528 447 B1 as a software function block for interconnection with function blocks of the control loop in a graphical user interface of an engineering system and loaded into an automation device for operation of the diagnostic device. The calculated numeric parameters or the numeric parameter matrix are then displayed on a faceplate for implementing a human-machine interface in an operator control and monitoring device of the automation engineering system. If desired, a change to the parameterization, for example an adjustment of the limit value for display of a warning message in the event of an increase in value of the numeric parameter, etc., can be carried out by an operator on the operator control and monitoring system.

In a particularly advantageous manner, the inventive diagnostic device for monitoring the operation of a control loop can be implemented in a software environment for cloud-based control loop monitoring. An example of a software environment of this type is represented by Siemens AG's data-based remote service "Control Performance Analytics". Data from customer installations is collected with the aid of software agents, aggregated and sent to a Siemens Service Operation Center, in which it is stored on a remote service computer. There, the data is evaluated semi-automatically with the aid of various "Data Analytics" software applications. If necessary, experts specially trained for the remote service can operate with high efficiency on this database. The results of the data analysis can be displayed on a monitor of the remote service computer and/or provided on a sharepoint server so that they can be viewed, e.g., in an internet browser by the end user customer, i.e. the operator of the automation engineering system.

The diagnostic method of the invention is accordingly preferably implemented in software or in a combination of software and hardware, so that the invention also relates to a computer program comprising program code instructions that are executable by a computer for implementing the diagnostic method. The invention also relates to a computer program product, in particular to a data medium or a storage medium, containing a computer program of the type that is executable by means of a computer. Such a computer program may, as described above, be stored as resident in a memory of an automation device or loaded into the same, such that during the operation of the automation device the monitoring of the performance of control loops is carried out automatically, or in the context of cloud-based monitoring of control loops the computer program can be stored as resident in a memory of a remote service computer or be loadable into the same.

These and other objects and features of the present invention will become apparent from the following detailed description considered in connection with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein similar reference characters denote similar elements throughout the several embodiments and figures.

DETAILED DESCRIPTION OF THE CURRENTLY PREFERRED EMBODIMENTS

Figure 1:
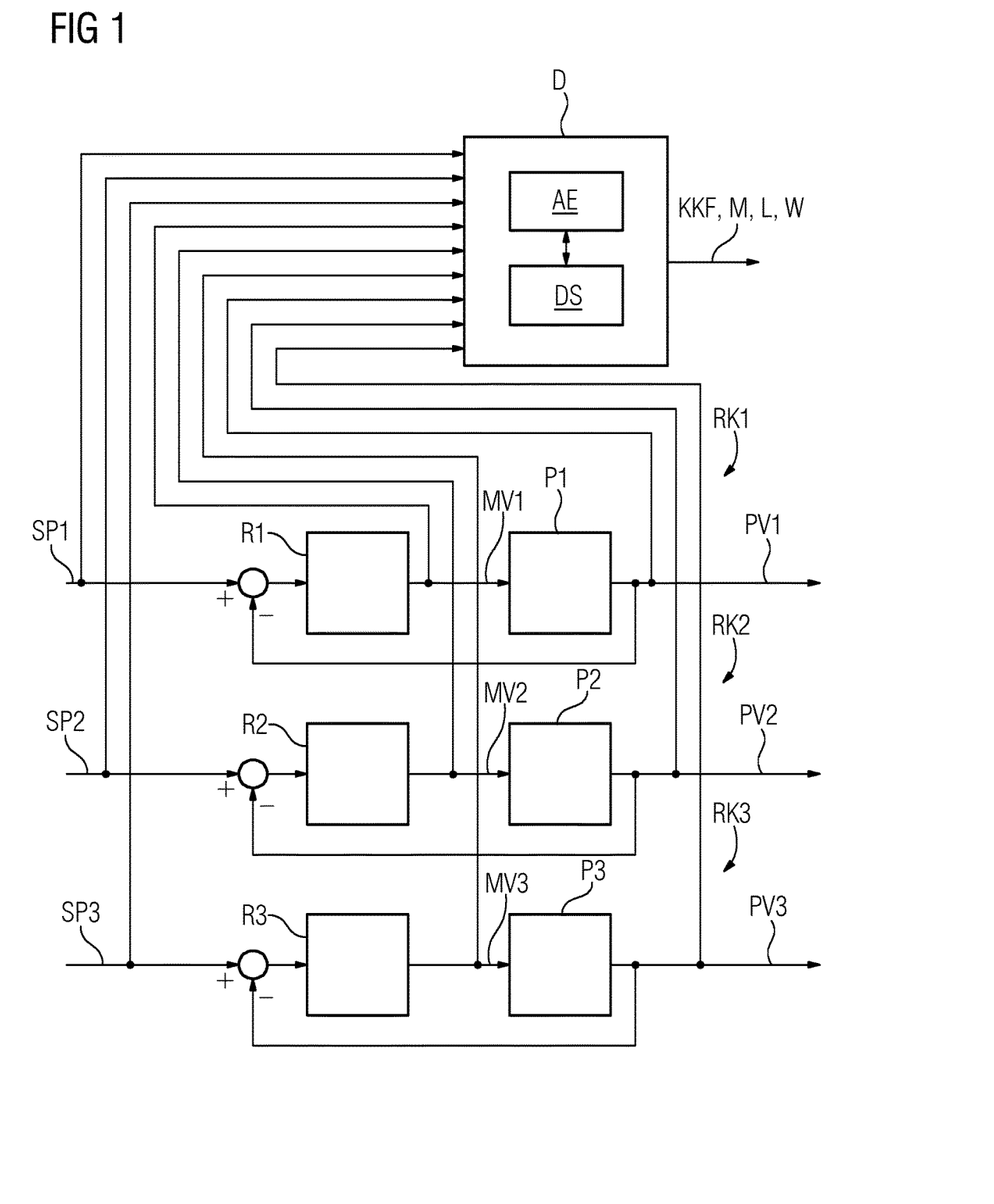
FIG. 1 is a schematic block diagram depicting three control loops and a diagnostic device.

FIG. 1 depicts, by way of example, three control loops RK1, RK2 and RK3 to be monitored and that forma part of an automation system, the details of which are not otherwise shown. In a real installation, the control loops RK1 and RK2 each serve to regulate a flow rate as respective controlled process variables PV1 and PV2, whereas the control loop RK3 serves to regulate a fill level in a tank as controlled process variable PV3. Control valves are employed as actuating elements P1, P2 and P3. In this example the control loop RK1 regulates a main inflow into the tank, the fill level of which is regulated by the control loop RK3. The control loop RK2 is disposed in a subsidiary inflow branch parallel to and having a lower volumetric flow rate than the main inflow and, accordingly, regulates the flow rate in a second path via which a medium, such as water, can flow into the tank. In order to regulate the fill level, control loop RK3 employs a discharge valve through which medium is discharged from the tank. Also identified in the individual control loops RK1, RK2 and RK3 are setpoints labeled with the respective reference signs SP1, SP2 and SP3, controllers labeled with the respective reference signs R1, R2 and R3, and manipulated variables labeled with the respective reference signs MV1, MV2 and MV3. The setpoints SP1, SP2 and SP3, the manipulated variables MV1, MV2 and MV3, and the controlled process variables PV1, PV2 and PV3 are routed to a diagnostic device D and there stored in a data memory DS as, respectively, sequences of setpoint data, actuating value data and actual-value data. On the basis of these sequences, an evaluation device AE calculates parameters KKF, a matrix M and/or a list L (FIG. 1) which are displayed to an operator to permit evaluation interactions among the control loops RK1, RK2 and RK3. This enables an accurate inference concerning the strength and the effective direction of the interactions, so that possible causes of problems due to cross-influences of the control loops RK1, RK2 and RK3 of the automation system are rendered more readily apparent to the user.

In addition, a warning signal W is output if, for example, a limit value of 0.6 is exceeded by a parameter KKF. In a particular case, undesirably strong cross-dynamics between subsystems that are thereby discovered can be reduced in a targeted manner by improving the control structure, as through the use of a multivariable controller. Reduction of such cross-influences in the overall process can result in increased productivity and lower costs.

Figure 2:
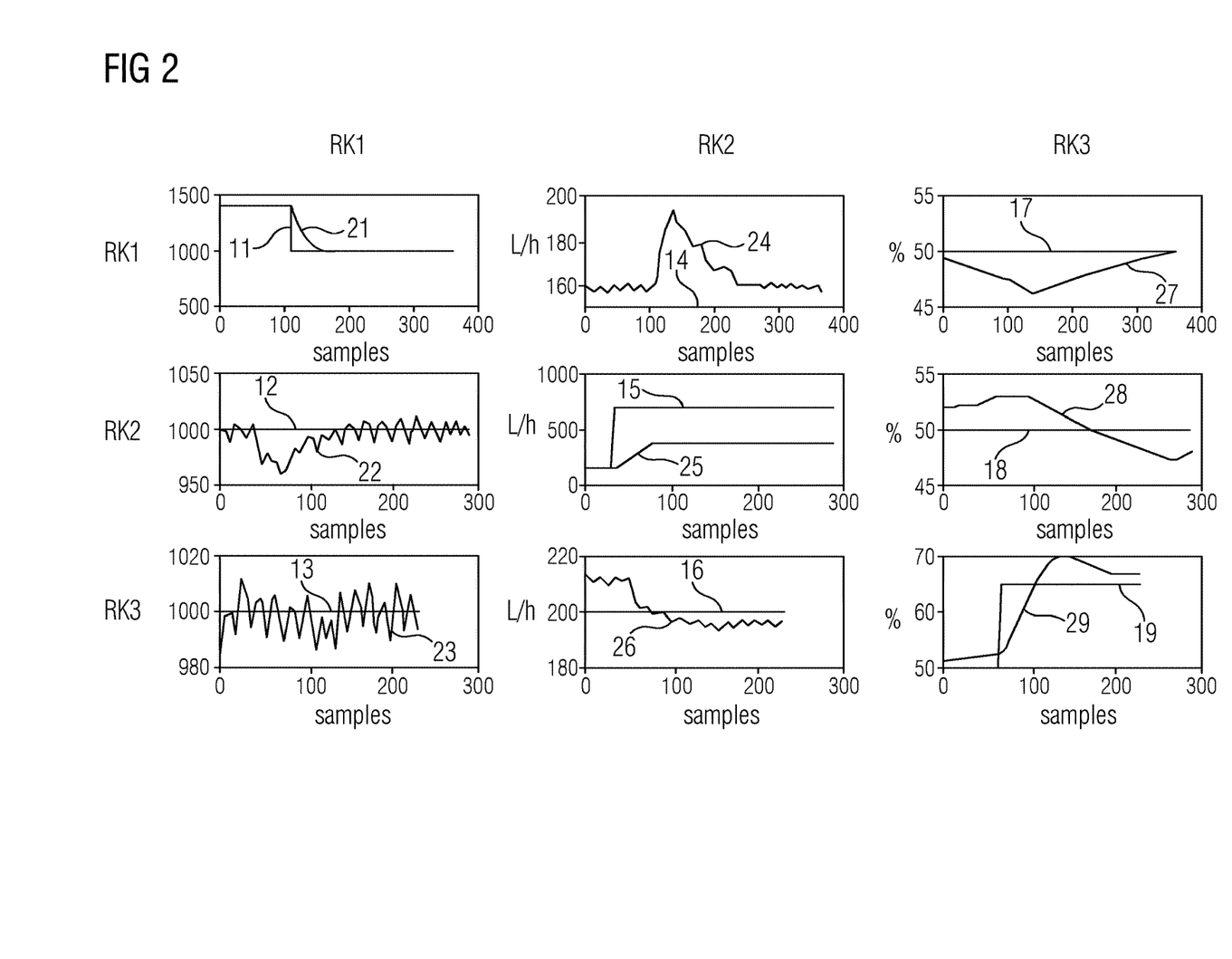
FIG. 2 depicts time response curves of setpoints and actual values used in the inventive diagnosis.
Figure 3:
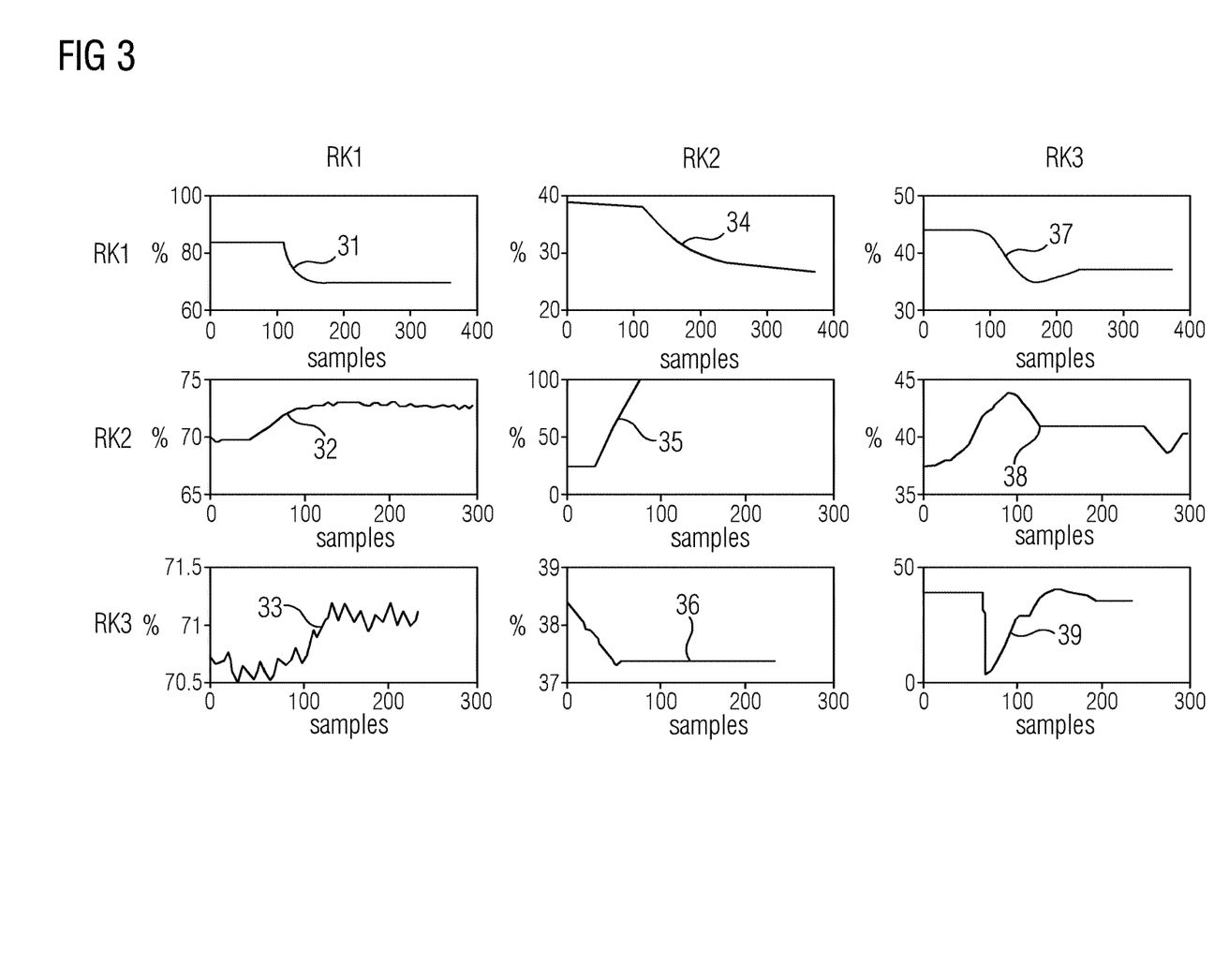
FIG. 3 depicts time response curves of setpoints corresponding to the depictions of FIG. 2.

FIG. 2 depicts a series of different response curves of the setpoints SP1, SP2 and SP3 and of the controlled process variables PV1, PV2 and PV3, and FIG. 3 correspondingly depicts response curves of the manipulated variables MV1, MV2 and MV3. In these sets of diagrams, the row labeling identifies in which control loop RK1, RK2 or RK3 a setpoint step change was accomplished as an excitation of the respective control loop RK1, RK2 or RK3; the column labeling identifies from which control loop RK1, RK2 or RK3 the data represented in the respective diagram originates. The respective numbers of the samples, i.e. the number of a data record in the respective sequence of data, are plotted on the x-axes. The respective volumetric flow rate L/h (liters/hour) is plotted on the y-axes of the diagrams in the columns of the control loop RK1 and the control loop RK2, while the fill height of the tank is presented as a percentage (%) on the y-axes of the diagrams that are associated with the control loop RK3. The response curves 11, 12 and 13 are setpoint response curves that were recorded at the control loop RK1, the response curves 14, 15 and 16 are setpoint response curves of the control loop RK2, and the response curves 17, 18 and 19 are setpoint response curves of the control loop RK3. It should be pointed out that the response curve 14 lies on the x-axis of the diagram in question, since the setpoint PV2 amounts to a constant 150 L/h. The response curves 21, 22 and 23 are actual-value response curves of the control loop RK1, the response curves 24, 25 and 26 are actual-value response curves of the control loop RK2, and the response curves 27, 28 and 29 are actual-value response curves of the control loop RK3. The response curves 31, 32 and 33 shown in FIG. 3 are manipulated variable response curves of the control loop RK1, the response curves 34, 35 and 36 are manipulated variable response curves of the control loop RK2, and the response curves 37, 38 and 39 are manipulated variable response curves of the control loop RK3.

For example, in order to evaluate an interaction effect of one control loop RK1 on another control loop RK2, given a predefined excitation as a result of a setpoint step change according to the response curve 11, the cross-correlation function is calculated for all possible, positive time shifts T of the response curve 24 with respect to the response curve 21 based on the response curves 21 and 24 of the respective controlled process variables PV1 and PV2, and the absolute value maximum of the cross-correlation function is determined as a first quantitative measure. In addition, a second quantitative measure is determined using the same calculation method based on the response curves 31 and 34 in FIG. 3. By calculating the arithmetic mean of the two determined quantitative measures, a parameter $KKF_{1,2}$ is obtained which enables an evaluation of the interaction effect of the control loop RK1 on the control loop RK2. In order to gain an overview of all interactions of the control loops, a parameter for evaluating the interaction is calculated in an analogous manner for each possible pair of control loops RK1, RK2 and RK3 and for each direction of influence within the respective pair.

Stated in general terms, for an automation system having n control loops to be monitored, a matrix can now be generated as the result of the calculations, the field elements of the matrix on the principal diagonal always being the value 1 of the auto-correlation function AKF and the remainder being the values of the different cross-correlation functions $KKF_{i,j}$, where i is the row index and j is the column index. If a representation in percent is desired, the matrix can be multiplied by the factor 100 in order to obtain a matrix Interaction in the following form:

$$\text{Interaction} = \begin{bmatrix} AKF_{1,1} & KKF_{1,2} & \ldots & KKF_{1,n} \\ KKF_{2,1} & AKF_{2,2} & \ldots & KKF_{2,n} \\ \vdots & \vdots & \ddots & \vdots \\ KKF_{n,1} & KKF_{n,2} & \ldots & AKF_{n,n} \end{bmatrix} * 100$$

As a result of the advantageous use of the cross-correlation functions it is furthermore possible to detect a coupling of two control loops having a negative effective direction. Based on the cross-correlation function it is therefore possible to identify not only the strength of the coupling, but also its effective direction, which corresponds to the sign of the gain of the transfer function of a coupling. This means that an inference can be made as to whether a positive setpoint change at one control loop of a pair of control loops to be monitored, for example at the control loop RK1, will trigger a positive or negative change in the controlled process variable at the respective other control loop of the pair of monitored control loops (e.g., the control loop RK2). To now be able to determine whether a coupling acting in the same or in the opposite direction is present, one examines the signs of the calculated values of the cross-correlation functions. This is explained in further detail in the following with reference, by way of explanatory example, to the pair of control loops RK1 and RK2, wherein control loop RK1 (the "main control loop") is excited by means of a setpoint step change. The respective effective direction for couplings of the remaining pairs of control loops to be monitored is determined in an analogous manner.

Firstly, an inference can be made concerning the effective direction, i.e. the sign of the transfer function of the controlled system P1 of the main control loop RK1. The auto-correlation functions of the manipulated variable MV1 and of the controlled process variable PV1 are in any event positive and therefore can provide no indication toward determining the effective direction. More authoritative, in contrast, is the cross-correlation function between manipulated variable MV1 and controlled process variable PV1 of the respective measurements when control loop RK1 is excited by a setpoint step change. The evaluation of the absolute value maximum of the cross-correlation function can be used for determining the sign of the gain of the considered transfer function of the controlled system P1. If the absolute value maximum is yielded as the result from a negative minimum of the cross-correlation function, then the gain is negative. Correspondingly, a positive gain can be inferred in the event of a positive maximum with the greatest absolute value of the cross-correlation function.

When determining the respective effective direction of the interaction effects of the control loops RK1, RK2 and RK3 on one another it is first necessary to consider the influences of setpoint step changes at the different control loops RK1, RK2 or RK3. If, for example, a negative setpoint step change at the control loop RK1 leads to a disturbance of the controlled process variable PV2 of the control loop RK2, then this will express itself in an initially sharp rise in the response curve 24 of the controlled process variable and will subsequently be corrected again by the controller R2. This means that a negative effective direction of the interaction is present. A positive influence, on the other hand, would mean that a positive disturbance will be produced in the other controlled process variable in the event of a positive setpoint step change. Due to the abrupt development of the disturbance and the slow corrective adjustment, however, this would have a negative similarity with the actual setpoint step change, since the controlled process variable of the disturbed control loop, similarly to the setpoint step change, would increase in a narrower time period than it would decrease. Such behavior is made evident for example from the response curves 22 and 25 in FIG. 2, which are characteristic of the negative interaction between the control loops RK2 and RK1 in the event of a setpoint step change corresponding to the response curve 15 at the control loop RK2. In the event of an effect acting in the same direction, as for example in the response curves 21 and 27 in FIG. 2, this applies correspondingly in the inverse sense. In other words, a negative setpoint step change corresponding to the response curve 11 leads to a negative disturbance corresponding to the response curve 27 which, however, requires more time for correction than to increase, thus leading to a negative sign of the cross-correlation function at its absolute value maximum.

In accordance with the foregoing, the polarities of the cross-correlation functions calculated for determining the first quantitative measures are ascertained in each case at their absolute value maximum and, in the event of negative polarity, an effect of one control loop on the respective other control loop acting in the same direction is indicated by means of a positive sign for the respective parameter and, in the event of positive polarity, an effect of one control loop on the other control loop acting in the opposite direction is indicated by means of a negative sign for the respective parameter.

Accordingly, the strengths of the interactions of control loops and the respective effective direction can be displayed simultaneously to the user in a tabular overview. In addition the mean value of the absolute amounts of the cross-correlation functions of the controlled process and manipulated variables is provided with the sign specified as described above and the following table is obtained as the result of the interaction analysis for the example of FIGS. 1 to 3 comprising three control loops RK1, RK2 and RK3, in which table the individual parameters KKF are contained in a matrix representation:

| \on Influence of | RK1 | RK2 | RK3 |
|---|---|---|---|
| RK1 | 100% | −54.2% | 68.6% |
| RK2 | −73.8% | 100% | 26.2% |
| RK3 | 0% | 0% | −100% |

In this table, as also in considering the diagrams shown in FIGS. 2 and 3, the coupling of the two flow rate control loops RK1 and RK2 is clearly evident in the results as well as in the measurements. The coupling of the flow rate control loops RK1 and RK2 to constant fluctuations in the fill level (i.e. the controlled process variable PV3 of control loop RK3), can only be discerned slightly. For example, if there is an excitation of the control loop RK1 as a result of a step change in accordance with the first row diagrams of FIGS. 2 and 3, a small inflection point in the response curve 27 of the fill level shortly after the excitation can be identified in the measurements. If the control loop RK3 is excited as a result of a setpoint step change, a disturbance can be seen in the response curve 26 of the controlled process variable PV2 of control loop RK2 shortly before its appearance. Advantageously, however, this disturbance is of no consequence because only positive time shifts are considered in the analysis of the interactions using the cross-correlation function.

As is rendered evident by the values of the parameters KKF entered in the above table, interactions between the control loops RK1, RK2 and RK3 can be reliably detected through this diagnosis. The two flow rate control loops RK1 and RK2 mutually influence one another and both have an effect on the fill level control loop RK3. Since the fill level control loop RK3 stands at the end of the effects chain, it has no active influence itself on the two other control loops RK1 and RK2. Advantageously, the respective effective direction of the interactions between the control loops RK1, RK2 and RK3 is also correctly indicated. An increasing flow rate in the control loop RK1 or control loop RK2 is linked with an interaction effect on the respective other flow rate control loop RK2 or RK1 with negative effective direction, while the fill level of the control loop RK3 will increase in accordance with a positive effective direction. Since the control loop RK3 regulates the fill level of the tank by way of its outflow, it exhibits a negative gain in the transfer function of the controlled system P3.

In order to now obtain an evaluation of the overall influence of each control loop RK1, RK2 and RK3 on the respective other control loops in the system, a normalized sum of the entered absolute amounts is calculated for each row of the results matrix. The largest value obtained in this process identifies the most influential control loop in an ordered list L (FIG. 1), which is output by the diagnostic device D. In the example explained with reference to FIGS. 1 to 3 and the above table, it is seen as a result of this diagnosis that the control loop RK1 has the greatest influence on the system. The control loop RK2 follows in second place, while the control loop RK3 has no effect on the two other control loops RK1 and RK2 and consequently possesses the lowest priority with regard to any optimization measures that may follow.

The advantages achieved by means of the invention are briefly summarized once again below:

By virtue of the calculation of the discrete cross-correlation function, no prior knowledge of any kind is required concerning the automation engineering system and the automation system for whose control loops an interaction analysis is carried out. For example, no normalization factors whatsoever are required and no scalings need to be performed. The diagnostic method requires only the measurements taken at the individual control loops in order to conduct an analysis of the interactions. By the use of simple statistical methods, the inventive method furthermore requires only a low computational overhead and is characterized by a high level of reliability in terms of the diagnostic conclusions.

Calculation of the cross-correlation functions both for controlled process variables and for manipulated variables and the subsequent mean value calculation additionally enables the detection of interactions which, if just the controlled process variables were to be considered, would be hidden due to the high control performance of affected control loops.

The inventive method permits reliable diagnostic inferences to be made concerning the strength and the effective direction of the couplings between control loops, which are presented as a tabular overview in a matrix of percentage values and signs. In an individual case, undesirably strong cross-dynamics between control loops that were discovered in this way can be reduced in a targeted manner by an improvement in the control structure, for example through the use of a multivariable controller. By reducing the cross-influences in the automation engineering installation it is thus possible to increase productivity and lower costs. The diagnostic method of the invention furthermore delivers a sorted list of all of the control loops, ordered by their influence, i.e. the effect that they exert on the other control loops. Control loops that, based on this criterion, have a particularly great significance can be handled with special priority within the scope of control performance monitoring and optimization.

While there have been shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. It is the intention, therefore, to be limited only as indicated by the scope of the claims appended hereto.

What is claimed is:

1. A diagnostic device for monitoring operation of first and second control loops of an automation system to reduce cross-influences between said first and second control loops, comprising:
   a data memory for storing sequences of actual-value data of the first and second control loops to be monitored; and
   an evaluation device operable to:
   (a) determine as a quantitative measure, for a predefined or predeterminable excitation resulting from changes in a setpoint setting of the first control loop, an absolute value maximum of a cross-correlation function based on at least one section of the sequences of actual-value data of each of the first and second control loops for a positive time lag of the sequence of actual-value data of a respective other of the first and second control loops; and
   (b) determine and display a parameter for evaluating an interaction effect of one of the control loops on the respective other of the control loops as a function of the first quantitative measure to localize problems by reducing the cross-influences between the first and second control loops of the automation system such that overall operation of the automation system is improved.

2. The diagnostic device of claim 1, wherein the predefined or predefinable excitation results from a setpoint step change of a predefined or predefinable height.

3. The diagnostic device of claim 1, wherein the data memory is operable to store sequences of actuating value data of the first and second control loops, wherein the evaluation device is further operable to determine a second quantitative measure based on the actuating value data, and wherein the parameter is a numeric parameter comprising an arithmetic mean of the first quantitative measure and the second quantitative measure.

4. The diagnostic device of claim 1, wherein the evaluation device is further operable to generate a warning signal if the parameter exceeds a predefined or predefinable limit value.

5. The diagnostic device of claim 1, wherein the evaluation device is further operable to calculate a polarity of the cross-correlation function at the absolute value maximum and, (i) where the calculated polarity is negative an effect of the first control loop on the second control loop in the same direction is indicated, and (ii) where the calculated polarity is positive an effect of the first control loop on the second control loop in the opposite direction is indicated.

6. The diagnostic device of claim 1, wherein the diagnostic device is further operable to monitor operation of a plurality of control loops, and wherein the evaluation device is further operable to display a matrix of entries comprising numeric parameters for evaluating an interaction effect of an i-th control loop of the plural control loops on a j-th control loop of the plural control loops, where i≠j.

7. The diagnostic device of claim 6, wherein the matrix further displays for at least some of the entries an effect in a same or opposite direction.

8. The diagnostic device of claim 6, wherein the evaluation device is further operable to display row sums of absolute amounts of the numeric parameters in the matrix.

9. The diagnostic device of claim 1, wherein at least the data memory and the evaluation device are implemented in software on a remote service computer for remote diagnosis of the control loops.

10. A diagnostic method for monitoring operation of plural control loops of an automation system to reduce cross-influences between said plural control loops, the method comprising:

storing sequences of actual-value data of first and second control loops of the plural control loops to be monitored;

determining as a quantitative measure, for a predefined or predefinable excitation resulting from a change in a setpoint setting of the first control loop, based on at least one section of the sequences of actual-value data of each of the first and second control loops, an absolute value maximum of a cross-correlation function for a positive time lag of the sequences of actual-value data of a respective other of the first and second control loops; and determining and displaying, as a function of the first quantitative measure, a parameter for evaluating an interaction effect of the first control loop on the second control loop to localize problems by reducing the cross-influences between the first and second control loops of the automation system such that overall operation of the automation system is improved.

11. A computer program stored in one of a storage device and a non-transitory computer-readable medium which, when executed on a processor of a computer apparatus, causes the processor to execute the method of claim 10.

12. A non-transitory computer readable medium encoded with a computer program executable by a computer apparatus for monitoring operation of first and second control loops of an automation system to reduce cross-influences between said first and second control loops, the computer program comprising:

program code for storing sequences of actual-value data of first and second control loops of the plural control loops to be monitored;

program code for determining as a quantitative measure, for a predefined or predefinable excitation resulting from a change in a setpoint setting of the first control loop, based on at least one section of the sequences of actual-value data of each of the first and second control loops, an absolute value maximum of a cross-correlation function for a positive time lag of the sequences of actual-value data of a respective other of the first and second control loops; and program code for determining and displaying, as a function of the first quantitative measure, a parameter for evaluating an interaction effect of the first control loop on the second control loop to localize problems by reducing the cross-influences between the first and second control loops of the automation system such that overall operation of the automation system is improved.

* * * * *